United States Patent Office 3,258,007
Patented June 28, 1966

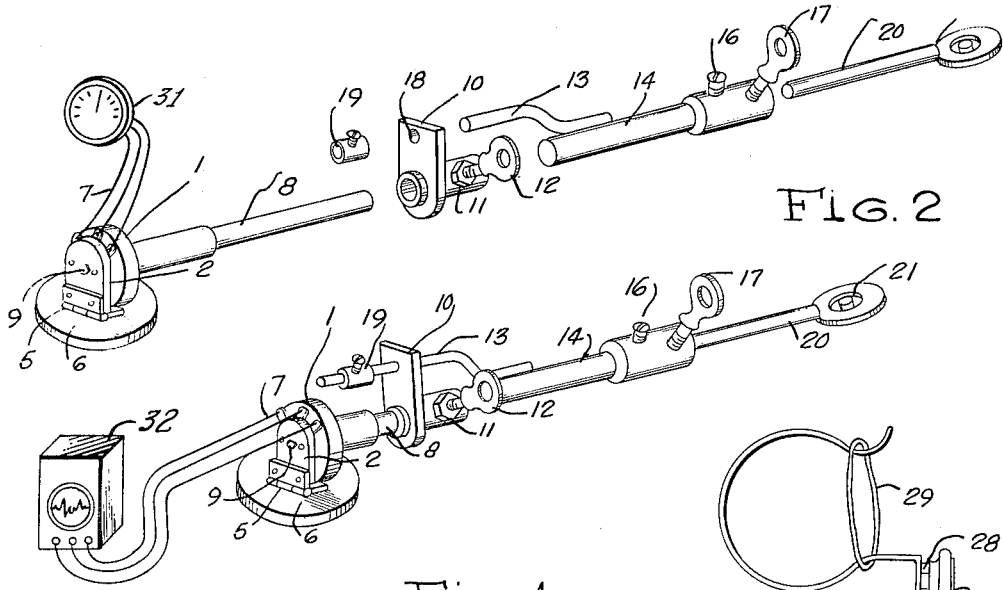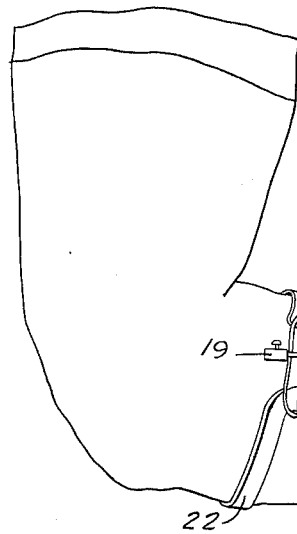
Fig.1 Fig.2 Fig.4 Fig.5 Fig.3
INVENTORS
PETER V. KARPOVICH &
GEORGE P. KARPOVICH
BY Joseph A. Hill
ATTORNEY

---

3,258,007
ROTARY ELECTROGONIOMETER FOR MEASURING DEGREE OF ROTATION OF THE FOREARM
Peter V. Karpovich, Springfield, and George P. Karpovich, Longmeadow, Mass., assignors to the United States of America as represented by the Secretary of the Army
Filed July 19, 1963, Ser. No. 296,412
5 Claims. (Cl. 128—2)

The present invention relates to electrogoniometers and more particularly to electrongoniometers for measuring and/or recording the degree of rotation of the forearm.

The object of this invention is to provide an instrument whereby the rotation of the forearm can be measured and recorded during activity; that is to say, without unduly restricting the other activities of the person subjected to the measurement. By keeping restriction of normal body activities to a minimum, the normal or unconscious forearm rotation accompanying ordinary activities as opposed to the conscious extreme rotation of the forearm under experimental conditions, can be more readily measured.

Other objects and advantages will be apparent to those skilled in the art upon reference to the following descriptions and the accompanying drawings in which:

FIG. 1 is a perspective view of the parts of the electrogoniometer disassembled in position for assembling;

FIG. 2 is a perspective view of the electrogoniometer assembled;

FIG. 3 is a perspective view of the electrogoniometer including arm clips, in operating position;

FIG. 4 is an elevational view of the forearm clip including electrongoniometer attachment; and FIG. 5 is an elevation view of the wrist attachment clip including the electrogoniometer shaft extension attachment means.

Briefly, the invention comprises a potentiometer with its housing universally mounted to a clip which is placed on the arm near the elbow. The shaft of the potentiometer is turned by a telescoping rotatable rod with a distal end universally attached to a second clip which is placed immediately proximally of the styloid process of the radius. When the forearm rotates and the hand pronates or supinates, the rotating telescoping arm follows this movement and causes a corresponding movement in the potentiometer. The potentiometer is connected by means of wires with either a meter 31 or oscillograph 32, or both, so that the degree of rotation can be read off the meter or recorded on the oscillograph.

Referring in detail to the preferred embodiment of this invention as depicted in the accompanying figures, the housing of potentiometer 1 is secured to metal plate 2 which is hinge mounted as at 5 on stud member 6 of a metal snap fastener of conventional design. The snap fastener consists of two parts: a stud member such as 6 and 21 and a receptacle member such as 23 and 27. Wires 7 lead from the potentiometer to the meter or recorder. Hollow shaft 8 is attached to the potentiometer housing by means of nut 9. Potentiometer arm 10, rigidly connected to sleeve 11, having a set screw 12, is secured on shaft 8 by set screw 12. Hollow shaft 14 having L-shaped pin 13, is also mounted on shaft 8 and secured thereto by set screw 16. Pin 13 projects through the aperture 18 in potentiometer arm 10; and collar 19 prevents pin 13 from disengaging aperture 18 as the potentiometer shaft telescoping motion takes place. Solid shaft 20, projecting partially within hollow shaft 14 is secured therein by set screw 17. At the distal end of shaft 20 is stud member 21 of a snap fastener which is used to secure the distal end of the telescoping potentiometer shaft to the wrist clip.

Arm clip 22 (FIGS. 3 and 4) is secured more firmly to the arm by rubber band 25. At one end of clip 22, and mounted thereon by hinge 24, is receptacle member 23 of a snap fastener. Wrist clip 26 is also firmly secured to the wrist by band 29 and mounts at one end the receptacle member 27 of a snap fastener which is mounted by hinge 28.

For the measurement of rotation of the forearm during activity, the rotary electrogoniometer is placed on the forearm so that the potentiometer 1 is anchored by means of the snap fastener members, stud 6 and receptacle 23, around the forearm near the elbow. The distal end of the telescoping shaft of the electrogoniometer is anchored to metal clip 26 which is placed immediately proximal of the styloid process of the radius. This anchoring is also done by pressing stud member 21 into the female receptacle member 27. This clip is also held into position more firmly upon the wrist by rubber band 29. When the forearm rotates the hand pronates or supinates; stud member 21, receptacle member 27 of a snap fastener and shaft 14 and 20 along with pin 13 follow the movement. Pin 13 drives the arm 10 of potentiometer 1 causing corresponding movement in the potentiometer. As explained above, the potentiometer is connected by means of wires with either a meter or oscillograph, or both. The potentiometer is calibrated so that the amount of rotation is expressed in degrees which can be read off the meter or from the oscillograph record. Hinges 24 and 28 are used to compensate a small backward movement of the electrogoniometer and to prevent the studs from snapping out. Stud member 6 coacting with receptacle member 23 and stud member 21 coacting with receptacle member 27, in combination with hinges 5, 24 and 28, respectively, provide the mechanical equivalents of universal joints.

We claim:

1. An electrogonimeter for measuring and recording rotations of the forearm comprising a potentiometer having a housing and a shaft, an arm attachment clip universally mounting said potentiometer housing, a wrist attachment clip, a telescoping rotational force transmission shaft universally mounted upon said wrist attachment clip and in engagement with said potentiometer shaft, said transmission shaft reacting with the forearm movements to produce a proportional rotational force against the potentiometer shaft.

2. A device for measuring rotations of the forearm during movement of the forearm comprising a potentiometer having a housing and a shaft, an arm attachment clip, rotatable snap fastening and hinge mounting means between said potentiometer housing and said arm attachment clip, a wrist attachment clip, a rotatable snap fastening means hingedly mounted upon said wrist attachment clip, a telescoping rotational force transmission shaft, one end universally fastened to said rotatable snap fastening means, and the other end engaging said potentiometer shaft; said transmission shaft reacting with the forearm movements to produce a proportional rotational force against the potentiometer shaft.

3. The measuring device of claim 2 further including a meter electrically connected to said potentiometer whereby the degree of rotation of the forearm can be read.

4. The measuring device of claim 2 further including an oscillograph electrically connected to said potentiometer whereby the degree of rotation of the forearm is measured and recorded by the oscillograph.

5. A device for measuring rotations of the forearm during movements of the forearm comprising:
(a) an arm attachment clip;

(b) a potentiometer including a housing and a potentiometer shaft;
(c) a rotatable snap fastening means hingedly attached between said arm attachment clip and said potentiometer;
(d) a potentiometer arm rigidly mounted on said potentiometer shaft;
(e) a telescoping rotational force transmission shaft, one end engaging said potentiometer shaft;
(f) an arm member, one end attached to said telescoping transmission shaft and the other end engaging said potentiometer arm; and
(g) a wrist attachment clip including a hingedly mounted rotatable snap fastener member, said wrist attachment clip universally mounting the other end of said telescoping transmission shaft, said telescoping transmission shaft and said arm member reacting with the forearm movements to produce a proportional rotational force against the potentiometer arm and shaft.

References Cited by the Examiner

UNITED STATES PATENTS

| | | | |
|---|---|---|---|
| 2,565,381 | 8/1951 | Leigton | 128—2 X |
| 2,646,034 | 7/1953 | Chapados | 128—1 |
| 3,133,355 | 5/1964 | Gordon | 128—2 X |

FOREIGN PATENTS 941,312    4/1956    Germany.

RICHARD A. GAUDET, *Primary Examiner.*
SIMON BRODER, *Examiner.*